Nov. 10, 1942.　　　R. A. RODRICK　　　2,301,583
SIGNAL DEVICE
Filed July 20, 1939　　　2 Sheets-Sheet 2
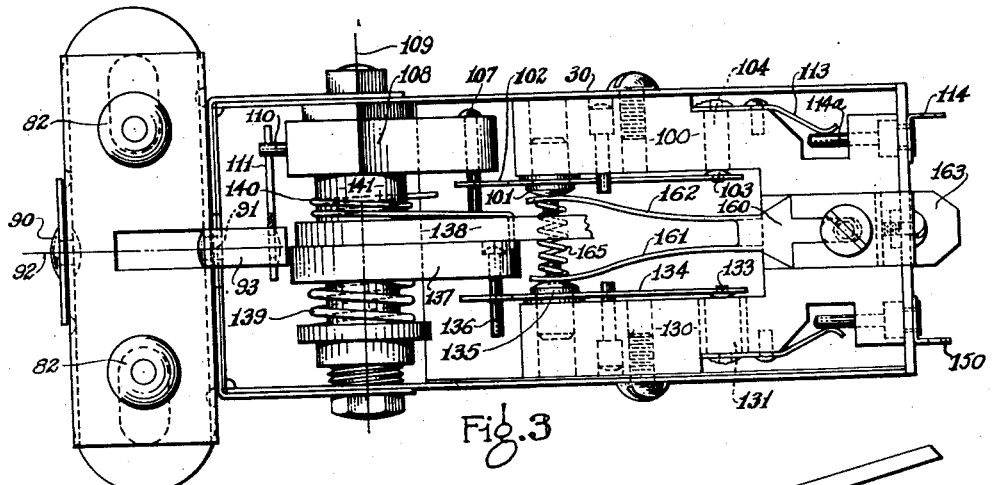
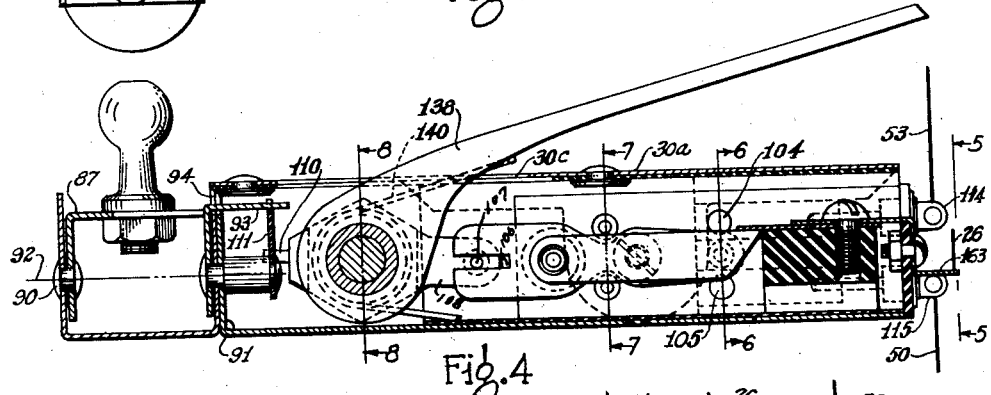
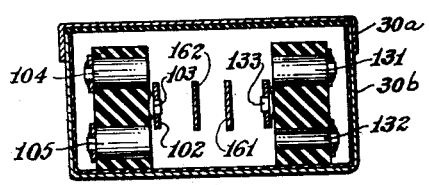
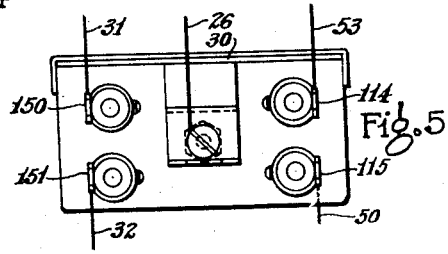
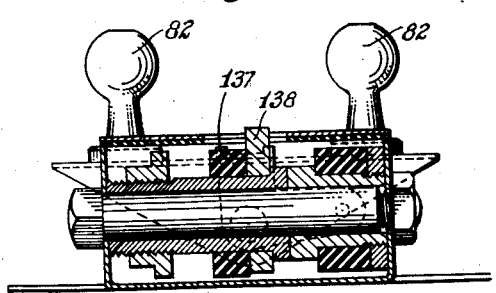
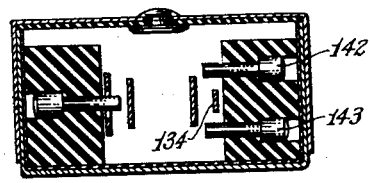
INVENTOR.
RAYMOND A. RODRICK.
BY Donald W. Farrington
ATTORNEY.

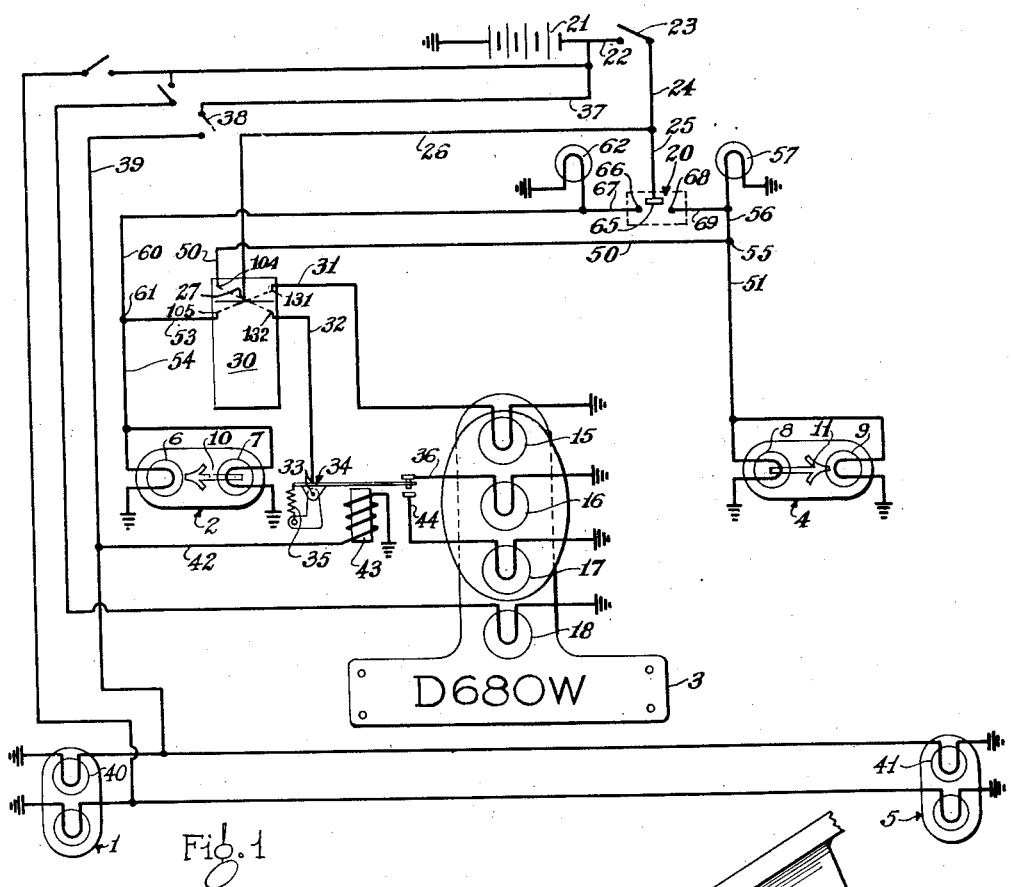

Patented Nov. 10, 1942

2,301,583

UNITED STATES PATENT OFFICE 2,301,583

SIGNAL DEVICE

Raymond A. Rodrick, Akron, Ohio

Application July 20, 1939, Serial No. 285,585

3 Claims. (Cl. 177—339)

This invention relates to a signal device for motor vehicles and more particularly to a system of electrically lighted signals which may be controlled by the operator of the motor vehicle.

It is among the objects of my invention to provide a signal device which is preferably mounted at the rear of a motor vehicle and which will indicate the directional progress of the vehicle, its acceleration and deceleration.

It is a further object of my invention to provide a signal device which may be operatively connected to the foot throttle and wherein the movement imparted to the foot throttle will produce an effect in the signal device to indicate further directional progress of the vehicle and the condition of the vehicle's forward movement.

It is a further object of my invention to provide a signal device in accordance with the preceding objects wherein throttle opening conditions produce a visual effect in a system of lights adapted to be arranged at the rear of the vehicle.

It is a further object of my invention to provide a signal device in accordance with the preceding objects wherein the throttle opening condition of the signal is modified or controlled by the operation of the conventional stop light signal device.

It is a further object of my invention to provide a signal device wherein the foot throttle pedal may be moved to a left or right position and such movement will, through the signal device, indicate by means of lights, a change of vehicular direction corresponding to the movements of the foot throttle pedal.

Other objects and advantages relating to simplicity in construction and economies of manufacture will appear from the following description and the appended drawings; wherein Figure 1 is a wiring diagram of a signal device constructed according to my invention;

Figure 2 is an elevation with parts in section of a switch box constructed according to my invention, arranged beneath the foot throttle of a motor vehicle;

Figure 3 is a plan view of the switch box for a signal device made according to my invention;

Figure 4 is a longitudinal sectional view of the switch box shown in Figure 3;

Figure 5 is an end view taken along the lines 5—5 as indicated in Figure 4;

Figure 6 is a sectional view taken along the lines 6—6 of Figure 4;

Figure 7 is a sectional view taken along the lines 7—7 as indicated in Figure 4; and Figure 8 is a sectional view taken along the lines indicated at 8—8 of Figure 4.

Due to the increase in motor vehicular traffic and to the large number of accidents occasioned thereby, numerous attempts have been made to provide signal devices to indicate the vehicle operator's intention with respect to further progress along the road.

Among the first signal devices provided to contribute to the safety of the traveling public was the stop light; that is, a signal light on the rear of the vehicle, connected to the brake so that an application of the vehicle brake would be indicated to those who were following the vehicle.

Further developments along this line have provided directional signaling devices; that is, signaling devices which could be operated by the motor vehicle operator to indicate his intentions with respect to making a turn to the left or right. The last-named type of signaling device has proved to be of such value to the traveling public that it has been made a statutory requirement for trucks, busses and the like in many states.

My invention contemplates the provision of a further improvement in signaling devices so that the motorist may indicate to those who may be following him, the throttle opening or speed condition which he is maintaining or intends to establish.

Briefly described, I have provided a signaling device which may be applied to the conventional motor vehicle and combined with the stop light arrangement thereon so that the operator of the vehicle may indicate by a signal whether he is going to make a turn to the left or right and at the same time indicate whether the throttle is being opened or closed and whether or not he is applying the foot brake.

I have provided a signaling mechanism including the switches and lights therefor, which is suited to a simple and inexpensive installation in the motor vehicle.

The operation of my signaling device, as thus briefly described, involves the conventional rocking of the foot throttle in a vertical plane producing acceleration or deceleration of the vehicle, a movement of the foot pedal from left to right and the conventional brake application movement.

In view of the novel manner in which I have combined the conventional foot throttle with the signaling device of my invention, it is unnecessary for the operator of the vehicle to use the hands in any manner to operate any part of my signaling device and it will be further understood that the only manual movement of the operator which is not present in the conventional foot throttle, is the movement of the throttle from left to right, or a rocking of the throttle about an axis running longitudinally of the vehicle.

I have found by experiments and tests conducted over a considerable period of time that the last-mentioned movement required of the operator may be readily acquired and soon becomes automatic in its nature so that no conscious effort on the part of the driver is required to operate my signaling device.

It will also be understood by those familiar with this art that the increasing traffic hazards make it more important that the driver keep both hands on the steering wheel and keep his eyes directed to the roadway in front of the vehicle. It will be appreciated that in those signaling devices which require a manual manipulation of switches or levers, that the driver must take one hand from the wheel and must look at such switches or levers which are to be operated. As will be understood from a further description of my device, a driver using my invention need not take his eyes from the roadway ahead of the vehicle, nor take his hands from the steering wheel, since the foot throttle is utilized to operate the signaling device.

In Figure 1, I have shown diagrammatically, signaling units indicated in their entirety as at 1 to 5, wherein units 1 and 5 are the conventional tail light and stop light applied to the left and right hand sides at the rear of an automobile. The signaling units indicated as at 2, 3 and 4 comprise the units which I propose to apply to the rear of a motor vehicle in about the arrangement shown in Figure 1, wherein the unit 3 occupies a central position at the rear of the vehicle and the units 2 and 4 occupy a position at the left and right of such central position. The signaling units 2 and 4 will be referred to herein as the directional signal units, inasmuch as they are constructed and arranged to indicate from the rear of the vehicle the intention of the operator with respect to making a turn to the left or right. Each of the units 2 and 4 includes a pair of lights as at 6—7 in unit 2 and 8—9 in unit 4. The lights in each unit are arranged to be lighted simultaneously and the units are each provided with an arrow as at 10 and 11, which arrows are arranged above the lights 7 and 8, respectively, so that when 7 and 8 are lighted, the arrow will point to the lights 6 and 9, respectively.

The central signal unit 3 includes four vertically arranged lights 15, 16, 17 and 18, and it is contemplated that over each of said four lights, a different colored lens will be provided. Preferably the top light 15 of the series shall be provided with a green lens or covering, the light 16 covered with an amber lens, the light 17 covered with a red lens and the light 18 covered with a transparent or frosted white lens. It will be understood as the description of my invention proceeds, that the green, yellow and red lights are so arranged with respect to the brake and throttle of the vehicle that they indicate the operating status of the vehicle. In other words, I have so connected the lights 15 to 17 with the brake and throttle that when the throttle is opened, the green light 15 will be lighted and the yellow and red lenses will remain in unlighted condition. When, however, the throttle is permitted to close and there is no application of the foot brake, the green light will go off and the yellow light will be turned on. In the event that the throttle is permitted to close and the brake is at the same time applied, both the green and the yellow lights, 15 and 16 respectively, will be turned off and the red light will be turned on.

It will be observed that I have followed the conventional signaling system used in street intersection stop light arrangements, wherein the yellow or caution light is arranged intermediate the green and red light and that I have provided that the green and red lights in my signaling system shall convey the same meaning as the green and red lights in the conventional street intersection stop light system.

The light 18 arranged beneath the lights 15, 16 and 17, is connected with the usual automobile lighting system and remains on with the lights of said system in a manner to illuminate a license plate arranged thereunder.

Inasmuch as there may be statutory requirements in certain states which specify that directional signals, such as 2 and 4 at the rear of the motor vehicle, must be provided with hand operated controls, I have provided a set of such controls for my directional signaling arrangement. The manual control for the directional signals, as used according to my invention, is indicated at 20.

Referring to the wiring diagram of Figure 1, 21 indicates the conventional storage battery and a wire 22 leads therefrom to a switch 23. The switch 23 may be closed to provide electrical energy required for the operation of my signaling system. A wire 24 leads from the switch 23 and one branch 25 thereof leads into the hand operated switch unit 20. The other branch of the wire 24 is indicated at 26 and this wire terminates at 27 in the switch box, indicated in its entirety as at 30. There are four wires leading from the switch box, two on the left hand side thereof and two on the right hand side as viewed in Figure 1. One of the wires 31 leads to the light 15, and, as will be understood from the description herein of the switch box 30, a certain operation of the switches therein will cause the green light 15 to be lighted. A second wire 32 leading from the switch box 30 terminates at 33 in a relay indicated in its entirety as at 34. The relay is provided with a spring 35 which is normally tensioned so that a circuit is maintained through the relay to wire 36, leading to the yellow light 16. The relay arrangement just described provides that normally, whenever a flow of current is established in wire 32 leading from the switch box, the yellow or amber light 16 will be lighted.

A wire 37 leading from the storage battery wire 22 terminates in a switch 38 which is the conventional stop light switch connected with the automobile brake and whenever the switch 38 is closed, the current flowing therefrom through wire 39, will light the stop lights 40 and 41 in the signal units 1 and 5, respectively. Connected to the stop light wire 39, I have provided a line 42 leading to the relay solenoid 43 and thus it will be understood that whenever the brake switch 38 is closed, the solenoid 43 will be energized and the electrical energy theretofore flowing through wire 32 will be directed to wire 44 leading to the red light 17. It will also be observed that as soon as the relay is actuated by the stop light, the flow of current to the yellow light 16 will be interrupted.

On the left hand side of the switch box 30, as viewed in Figure 1, I have provided a line 50 which leads through branch 51 to the right hand directional signal unit 4. A second line leading from the switch box 30 on the left hand side is indicated at 53 and current flowing therethrough to line 54 returns to the directional signal unit 2 at the left hand side of the vehicle.

It will be understood that when electrical energy is directed through the switch box into line 50, that the directional signal unit 4 will be lighted so as to indicate a turn to the right and that when a circuit is established through line 53, the direction unit 2 will indicate a turn to the left. The circuit for the right hand directional signal is connected as at 55 to a line 56 leading to a dash signal, so that whenever the right hand signal unit 4 is lighted a dash light 57 in the driver's compartment will also be lighted. A similar arrangement is effected in connection with the left hand directional signal wherein a line 60 is connected as at 61 to the left hand line 54 so as to operate the dash signal light 62.

In the event that it is desired to operate the direction signal lights 2 and 4 by hand operated means, the contact member 65 within the hand switch 20 may be moved into engagement with the contact 66 of line 67 or into engagement with the contact 68 of line 69. From the preceding description of the directional signaling system, it will be understood that as soon as the member 65 is connected to line 67, the left hand directional signal will be lighted irrespective of any connections made within the switch box 30. In a like manner, it will be observed that when the member 65 is connected to the line 69, the right hand signal unit 4 will be lighted.

Referring now to the foot throttle arrangement whereby the lights of the signal system of my invention may be controlled, I have shown in Figure 2 the switch box unit 30 mounted on the floor board of an automobile directly beneath the foot throttle. The box 30 comprises a bottom rectangular case 30b which contains the switch elements controlling the various lights at the rear of the vehicle and a top cover 30a removably secured to the bottom case. The cover 30a is slotted as at 30c to permit an actuating arm 138 to project upwardly against the underside of the throttle.

The foot throttle indicated in its entirety as at 80 is ordinarily provided at the lower rear portion thereof with a pair of spherical recesses as at 81, designed to receive ball studs or the like as as 82. Ordinarily the portion of the foot throttle provided with the recesses is made of rubber or like resilient material so that the throttle in its entirety may be forced or snapped on to the studs 82. The forward end of the throttle is provided with a similar spherical recess 83 adapted to snap over a rounded end on an accelerator or throttle rod 84.

Ordinarily the studs indicated at 82 are securely fixed to the floor board 85 of the automobile. When, however, a signal system according to my invention is installed, I secure the studs 82 to a bracket 87 pivotally carried by the rear wall of the switch box 30, and the box 30 may be bolted or otherwise secured to the floor board 85 of the vehicle. The bracket 87 is preferably secured to the switch box 30 by means of the aligned pivots 90 and 91 so that the bracket 87 in its entirety may be rocked from side to side about the axis indicated at 92. A tongue 93 secured to the bracket 87 and rocked therewith projects through a slot 94 to actuate the directional switch which is more fully described hereinafter.

As will be understood as this description proceeds, a rocking of the foot pedal 80 about the axis 92 to one side will effect a lighting of the signal light 2 and a rocking of the foot throttle to the other side will bring about a lighting of the signal light 4.

Referring to Figure 3 of the drawings, the upper right hand end of the switch box is provided with a block of insulating material 100 and along the lower side of such block, as at 101, is pivoted a flat strip of metal 102 which is provided at its right hand end with a contact button 103. Embedded within the block 100 are a pair of metal conducting elements 104 and 105, both of which are arranged within the arcuate path of the button 103 as the plate 102 is rocked on its pivot 101. The end of the plate 102 remote from the button 103 is slotted as at 106 to receive an actuating pin 107 which is carried by a member 108 adapted to be rocked about the axis 109 extending transversely of the switch box. The rocking member 108 at the side thereof remote from the pin 107 is provided with a pin 110 which is adapted to extend through a slot formed in the pivoted bell crank 111.

The elements 104 and 105 are arranged to be connected electrically through resilient metal contacts such as 113 to spaced terminals 114 and 115 at the exterior of the switch box 30. Electrical energy is led into plate 102 from the battery by means 160 more fully described below. One of the terminals, namely 114, is designed to be connected to the line 53 shown in the wiring diagram. From the preceding description it will be understood that when the throttle is rocked to one side, the bell crank 111 will be oscillated about the axis 92 so as to move the button 103 into contact with either element 104 or element 105 depending upon the side to which the foot throttle is rocked and thus either directional light 2 or 4 will be lighted. In the described manner, the operator of the vehicle may indicate by the signal light at the rear thereof, whether he intends to make a turn to the right or left.

Referring again to Figure 3, the lower side of the switch box 30 is provided with a block of nonconducting material 130 shaped similarly to the block 100. The block 130 is provided with vertically spaced contacts 131 and 132 which are within the arcuate path of a contact button 133 carried by a pivoted plate 134. The plate 134 is pivoted as at 135 and is provided at its end remote from 133 with a fork or slot to receive a pin 136 carried by an actuating member 137. The member 137 is frictionally pressed against an actuating arm 138 by means of a spring 139. A spring 140 is coiled about the sleeve 141 and secured to the underside of the actuating arm 138 in a manner to urge the same against the under side of the throttle 80. Due to the frictional driving or clutching action between 137 and 138, any movement of the member 138 is imparted to the member 137 within the limits of movement of the member 137. The movement of the member 137 is limited, however, by means of a pair of spaced pins 142 and 143, arranged in the path of swinging movement of the plate 134. As soon as movement of the plate 134 is arrested by means of pins 142 or 143, the actuating member 138 may continue its motion by breaking the frictional bond between 137 and 138. As soon, however, as the member 138 is moved in the opposite direction, the frictional drive between 137 and 138 becomes effective to move the plate 134 in the other direction.

The contact elements 131 and 132 terminate as at 150 and 151 on the forward exterior of the switch box 30. The terminals 150 and 151 are designed to be connected to the lines 31 and 32, respectively, of the wiring diagram shown in Figure 1. The result of this connection, it will be understood, is such that when the actuating member 138 is moved downwardly in response to foot throttle movement, an electrical circuit will be completed, leading to the signal light 15, which, being a green light, indicates to those following the vehicle that the operator is establishing an accelerated condition. When, however, the foot throttle is released so as to permit the member 138 to be moved upwardly, an electrical circuit will be established through the line 32 and will light the orange or caution signal at the rear of the vehicle.

Preferably the element 131 which establishes the circuit effecting the lighting of the green light is proportioned to cover a greater portion of the movement of the contact button 133 than the element 132. The advantage of such difference in proportions between 131 and 132 is that there is a greater dwell or more throttle movement permitted following the lighting of the green light.

Within the switch box 30 and at the center thereof, as at 160, is a brass or copper element having two diverging arms 161 and 162, which are adapted to bear at their free ends against the pivots 135 and 101, respectively. The element 160 is designed to be connected through terminal 163 with the line 26 of the wiring diagram leading from the storage battery. Through the medium of the line 26 and element 160, the current from the storage battery is led through the pivot members 101 and 135 to the plates 102 and 134, respectively. A spring 165 is employed to maintain a resilient firm contact throughout the pivoting motion of the plates 102 and 134.

From the foregoing description, it will be appreciated that whenever the foot throttle 80 is rocked from side to side about the axis indicated at 92, an electrical circuit will be completed within the switch box with either line 50 or 51 so as to light a signal light 4 or the signal light 2, to indicate the driver's intended directional progress for the vehicle.

It will be observed by reference to Figures 1 and 5 that there are five individual wires leading into the switch box 30. The arrangement I have provided permits all five wires to be led into the box 30 at one end and I prefer that such wires be enclosed within a single cable provided at its box terminal end with prongs or "jacks" which may be resiliently retained in the box. Such prongs may be of the type indicated at 114a.

It will also be appreciated that movement of the foot throttle about its transverse axis, that is, the normal accelerating and decelerating movement of the throttle, will be transmitted to the actuating member 138 so as to light either the green light 15 to indicate acceleration of the vehicle, or the caution light 16 to indicate a decelerating or stopping motion of the vehicle.

Although I have shown and described one form of my invention in considerable detail, it will be understood that variations may be made therein without departing from the scope thereof, as defined in the following claims.

I claim:

1. A signaling device comprising spaced lights arranged at the rear of the vehicle to indicate directional progress of the vehicle and lights arranged therebetween to indicate the acceleration and deceleration positions of an accelerator pedal of the vehicle, a foot pedal mounted to rock about one axis to establish a directional signal light and to rock upon an axis transverse thereto to control said acceleration and deceleration lights.

2. In a signaling device a foot throttle mounted to rock upon an axis extending transversely of the vehicle to effect acceleration or deceleration, said foot throttle being also mounted to rock upon an axis transverse to the first-mentioned axis, a switch box arranged beneath said foot throttle provided with fixed and movable contacts, signal lights at the rear of the vehicle, electric current conductors connecting said contacts and lights, certain of said movable contacts operated in response to rocking about said first axis to effect a lighting of a vehicle progress signal to indicate the position of said foot throttle, other of said contacts movable in response to throttle movement about said second-named axis to effect a lighting of a directional signal light.

3. A signal light system for motor vehicles, a foot throttle provided with an universal joint support whereby said throttle is mounted to rock about axes transverse wih respect to each other, rocking movement about one axis effective to control acceleration and deceleration of the engine of the vehicle, a switch box mounted beneath said throttle provided with a pair of independently movable switches, one switch operatively connected to the throttle moved in response to acceleration and deceleration throttle movement, the other switch operatively connected to the throttle moved in response to rocking of the throttle about its other axis, a pair of spaced directional lights, a pair of engine throttle indicating lights, said throttle-indicating lights connected to said one switch for selective operation and said directional lights connected to said other switch for selective operation.

RAYMOND A. RODRICK.